United States Patent [19]

Idel et al.

[11] 4,375,525

[45] Mar. 1, 1983

[54] USE OF ORGANIC SILICON COMPOUNDS FOR STABILIZING AND BRIGHTENING POLYCARBONATES WHICH ARE FREE FROM PHOSPHITES AND FREE FROM BORIC ACID ESTERS

[75] Inventors: Karsten Idel, Krefeld; Wolfgang Cohnen, Leverkusen; Dieter Freitag, Krefeld; Ottfried Schlak, Leverkusen, all of Fed. Rep. of Germany

[73] Assignee: Bayer Aktiengesellschaft, Leverkusen, Fed. Rep. of Germany

[21] Appl. No.: 148,621

[22] Filed: May 12, 1980

[30] Foreign Application Priority Data

May 21, 1979 [DE] Fed. Rep. of Germany ....... 2920450

[51] Int. Cl.$^3$ ............................................. C08K 5/54
[52] U.S. Cl. .................................... 524/108; 524/109; 524/261; 524/262; 524/264
[58] Field of Search ................... 260/45.7 R, 29.1 SB; 528/198; 524/107, 108, 114, 261, 262, 264, 109

[56] References Cited

U.S. PATENT DOCUMENTS

| | | | |
|---|---|---|---|
| 2,999,835 | 9/1961 | Goldberg | 525/464 |
| 3,026,298 | 3/1962 | Lee | 528/198 |
| 3,509,090 | 4/1970 | Miller | 260/45.7 |
| 3,625,920 | 12/1971 | Borkowski | 260/47 |
| 3,673,146 | 6/1972 | Factor | 260/29.1 SB |
| 4,066,611 | 1/1978 | Axelrod | 260/45.7 R |
| 4,070,330 | 1/1978 | Rawlings | 260/37 PC |
| 4,102,859 | 7/1978 | Eimers et al. | 260/45.8 A |
| 4,130,530 | 12/1978 | Mark et al. | 260/29.1 SB |
| 4,138,379 | 2/1979 | Scott et al. | 260/29.1 SB |
| 4,148,773 | 4/1979 | Mark et al. | 260/29.1 SB |
| 4,197,384 | 4/1980 | Bialous et al. | 260/45.7 R |
| 4,225,483 | 9/1980 | Eimers et al. | 260/45.8 A |
| 4,230,611 | 10/1980 | Mark et al. | 260/29.1 SB |

FOREIGN PATENT DOCUMENTS

| | | |
|---|---|---|
| 18235 | 5/1979 | European Pat. Off. . |
| 1770329 | 8/1970 | Fed. Rep. of Germany . |
| 2413798 | 3/1974 | Fed. Rep. of Germany . |
| 2510463 | 9/1976 | Fed. Rep. of Germany . |
| 2659756 | 7/1977 | Fed. Rep. of Germany . |
| 2741064 | 3/1978 | Fed. Rep. of Germany . |
| 1141869 | 2/1969 | United Kingdom . |
| 1441367 | 3/1974 | United Kingdom . |

*Primary Examiner*—John Kight, III
*Assistant Examiner*—R. A. White
*Attorney, Agent, or Firm*—Gene Harsh; Lawrence S. Pope; Aron Preis

[57] ABSTRACT

The present invention relates to stable and bright thermoplastic aromatic polycarbonate compositions characterized in the absence of phosphites and boric acid esters and in that they comprise an additive amount of an organic-silicon compound having on its silicon atom three or four organo-oxy radicals.

6 Claims, No Drawings

USE OF ORGANIC SILICON COMPOUNDS FOR STABILIZING AND BRIGHTENING POLYCARBONATES WHICH ARE FREE FROM PHOSPHITES AND FREE FROM BORIC ACID ESTERS

BRIEF DESCRIPTION OF THE INVENTION

The present invention relates to the use of organic silicon compounds having three or four organooxy radicals on the Si atom, in amounts of 0.01 to 1% by weight, preferably in amounts of 0.01 to 0.5% by weight, in each case relative to the total weight of organic silicon compounds and polycarbonate, for stabilizing and brightening thermoplastic, aromatic polycarbonates which are free from phosphites and free from boric acid esters, especially those which are prepared by the known solution processes, and most especially, those which are also free from pigments.

DESCRIPTION OF THE PRIOR ART

According to DE-OS (German Published Specification) No. 2,726,662, polycarbonates can be made stable to resist oxidation under heat by using cyclic diphosphites. Epoxides or silanes are recommended as costabilizers, but when silanes are used as costabilizers, the silane has no costabilizing effect during the heat aging and during the treatment in the steam autoclave, but rather causes deterioration (see samples C and D in both Tables II and III of that prior art reference). Only the stability to discoloration under the influence of heat, such as during shaping under extreme temperatures is improved by the addition of a silane (see Table I of that reference).

In contrast, the epoxide as a costabilizer causes deterioration in the stability to discoloration under heat test according to Table I of that reference and an improvement, which is in some cases considerable, in the heat aging and steam autoclave tests according to Tables II and III of the same reference.

According to DE-OS (German Published Specification) No. 2,659,756, polysiloxane liquids improve the stabilizing action of phosphites and, in some cases, that of epoxide compounds in polycarbonates.

According to DE-OS (German Published Specification) No. 2,741,064, silanols improve the stabilizing action of phosphites in pigmented polycarbonates (see the examples of this German Published Specification). Epoxide compounds can be used in addition to or instead of the phosphites.

According to DE-OS (German Published Specification) No. 2,510,463 (LeA 16,231), mixtures of neutral esters of phosphorous acid and oxetane compounds are used for stabilizing polycarbonates. Suitable oxetane compounds are also esters of silicic acid with alcohols which contain oxetane (see page 4 of that reference).

According to European Patent Application No. 78 101 260.4 (LeA 18,380-EP), boric acid esters containing oxetane groups, optionally in combination with boron-free oxetane compounds, or mixtures of boric acid esters which are free from oxetane groups and boron-free oxetane compounds are suitable for stabilizing phosphite-free polycarbonates. Silicic acid esters can be used as the boron-free oxetane compounds.

It was thus surprising to discover that, according to the present invention, organic silicon compounds are capable of stabilizing and brightening polycarbonates which are free from phosphites and free from boric acid esters, especially those which are free from pigments.

According to British patent specification No. 1,141,869, silanes which are suitable as transesterification catalysts for the preparation of polycarbonates by the melt transesterification process are those which, at the same time, have a stabilizing effect and thus do not give rise to discoloration and clouding of the prepared polycarbonate, a side effect noted to be caused by some transesterification catalysts.

The silanes employed contain at most one alkoxysilane radical. According to DE-OS (German Published Specification) No. 1,770,329 and U.S. Pat. No. 3,625,920, such silanes can also be employed together with borates as transesterification catalysts with the same aim.

However, from these literature references, it cannot be deduced that the addition of organic silicon compounds to polycarbonates, in particular to those which are prepared by the solution process, also has a brightening effect in addition to improving polycarbonate stability upon exposure to heat.

In U.S. Pat. No. 4,138,379, silanes, optionally in combination with phosphites and/or epoxides, are claimed as additives to increase the melt flow and as stabilizers vis oxidative degradation under the influence of heat. In all the examples of that reference, however, a mixture of one part of diphenyl oxtyl phosphite and two parts of 3,4-epoxycyclohexylmethyl 3,4-epoxycyclohexanecarboxylate is also added so that it is not established whether the silicon compounds alone without phosphites have a sufficient stabilizing effect. Phosphites are of little advantage, for example, with regard to the hydrolysis properties of the polycarbonate. Moreover, a positive effect is noted only after processing and not after heat aging over a long period.

DETAILED DESCRIPTION OF THE INVENTION

Organic silicon compounds in the sense of the present invention are those which contain three or four organooxy radicals bonded to the Si atom.

Preferred silicon compounds are those of the general formula

$$(R_1)_a\text{-Si-}(OR_2)_b \qquad (1)$$

wherein
$a+b=4$,
$b$ is 3 or 4,
$R_1$ is H, $C_1$–$C_{18}$-alkyl, $C_2$–$C_{18}$-alkenyl, $C_6$–$C_{24}$-aryl, $C_7$–$C_{24}$-alkylaryl or $C_7$–$C_{24}$-aralkyl, and
$R_2$ is $C_1$–$C_{18}$-alkyl, $C_2$–$C_{18}$-alkenyl, $C_5$–$C_{10}$-cycloalkyl or $C_7$–$C_{24}$-aralkyl.

The alkyl and alkenyl radicals $R_1$ and $R_2$ can be linear or branched.

The C radicals $R_1$ and $R_2$ can contain any desired nonbasic substituents which are stable and inert under the influence of heat during thermoplastic processing of the polycarbonates, such as, for example, halogen atoms, such as chlorine or bromine, $C_1$–$C_{18}$-alkoxy groups, $C_6$–$C_{24}$-araloxy groups, heterocyclic radicals containing oxygen, sulphur and/or nonbasic nitrogen atoms, keto groups, ester groups, nitrile groups, ether groups and/or thioether groups.

Examples of preferred radicals $R_1$ are methyl, ethyl, vinyl, propyl, 3-chloropropyl, 3-methacryloxypropyl, butyl, pentyl, hexyl and cyclohexyl.

Examples of preferred radicals $R_2$ are butyl, pentyl, hexyl, octyl, stearyl, decyl, cyclohexyl, methylcyclohexyl, (3-methyloxetan-3-yl)-methyl, (3-ethyloxetan-3-yl)-methyl, (3-amyloxetan-3-yl)-methyl, 2-methoxyethyl, 3-methoxy-propyl, 3-ethoxypropyl, 3-(thiomethyl)-propyl, (5-ethyl-1,3-dioxan-5-yl)-methyl and 2,3-epoxy-propyl.

In comparison to nonstabilized polycarbonate, the aromatic polycarbonates stabilized according to the invention have a significantly higher transparency to light and constancy of color both directly after thermoplastic processing and after a heat aging lasting several thousand hours. Especially after the heat aging, the polycarbonates stabilized according to the invention with silicon compounds of formula (1) are found to be superior to those containing triorganophosphites on the basis of the smaller change in color.

Moreover, the silicon compounds used in this invention, in particular those of formula (1), in no way influence the hydrolytic stability of the aromatic polycarbonates while triorgano-phosphites can reduce that stability.

There are mainly two processes available for the preparation of silicon compounds of the formula (1):

1. The reaction of silicon halides with alcohols according to the equation:

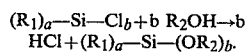

2. The transesterification of silicic acid esters of lower alcohols with the corresponding alcohols, the lower alcohols liberated (ethanol and methanol) being distilled off, according to the equation:

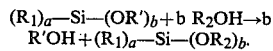

$R' = CH_3, C_2H_5$.

The preparation by these methods is described, for example, in: D. Ridge and M. Todd, J. Chem. Soc. 1949, pages 2637–2640 or V. Bazant, V. Chvalovsky', J. Rathousky': Organosilicon Compounds, Volume 1, pages 51–61, Academic Press, New York, 1965.

The following compounds may be mentioned as examples: tetrabutoxysilane, tetrapentoxysilane, tetrahexoxysilane, tetraoctoxysilane, tetradecoxysilane, tetrastearoxysilane, tetracyclohexoxysilane, tetrakis-(methylcyclohexoxy)-silane, methyl-tributoxysilane, methyl-trihexoxysilane, methyl-trioctoxysilane, methyl-tridecoxysilane, methyl-tristearoxysilane, methyltricyclohexoxysilane, methyl-tris-(methyl-cyclohexoxy)-silane, vinyl-tributoxysilane, vinyl-trihexoxysilane, vinyl-trioctoxysilane, vinyl-trihexoxysilane, vinyl-tristearoxysilane, vinyl-tricyclohexoxysilane, vinyl-tris-(methyl-cyclohexoxy)-silane, tributoxysilane, trihexoxysilane, trioctoxysilane, tridecoxysilane, tetrakis-(2-ethoxy-ethoxy)-silane, methyl-tris-(2-ethoxy-ethoxy)-silane, vinyl-tris-(2-ethoxy-ethoxy)-silane, vinyl-tris-(2-methoxy-ethoxy)-silane, methyl-tris-(2-methoxy-ethoxy)-silane, 3-chloropropyl-triethoxysilane, 3-chloropropyl-tributoxysilane, 3-chloropropyl-trihexoxysilane, 3-chloropropyl-trioctoxysilane, 3-glycidylpropoxy-triethoxysilane, 3-glycidylpropoxy-tributoxysilane, 3-glycidylpropoxy-trihexoxysilane, 3-glycidylpropoxy-trioctoxysilane, isobutyl-tributoxysilane, isobutyl-trioctoxysilane, tetrakis-(2-methoxy-ethoxy)-silane, 3-methacryloxypropyl-trimethoxysilane, tetrakis-[(3-methyloxetan-3-yl)-methoxy]-silane, tetrakis-[(3-ethyloxetan-3-yl)-methoxy]-silane, tetrakis-[(3-amyloxetan-3-yl)-methoxy]-silane, methyl-tris-[(3-methyloxetan-3-yl)-methoxy]-silane, tetrakis-[(5-ethyl-1,3-dioxan-5-yl)-methoxy]-silane, methyl-tris-[(5-ethyl-1,3-dioxan-5-yl)-methoxy]-silane, tetrakis-(2,3-epoxy-propoxy)-silane and methyl-tris-(2,3-epoxy-propoxy)-silane.

Incorporation of the organic silicon compounds used in this invention, in particular those of the formula (1), into the aromatic polycarbonates can be effected either by metering the silicon compounds, in the pure form, into the molten polycarbonate or by metering them into the polycarbonate solution, as a solute in a low-boiling solvent, such as, for example, methylene chloride. The stabilized, aromatic polycarbonates according to the invention can also be prepared by impregnating the powdered or granular polycarbonate with the pulverulent or liquid silicon compounds, if appropriate, with a solution of the silicon compound in a solvent, such as methylene chloride, in a suitable mixing apparatus by tumbling and subsequent thermoplastic processing by known arts. Before incorporating the organic silicon compounds, the polycarbonates to be stabilized should have a moisture content of less than 0.01% by weight, relative to the weight of polycarbonate resin, in order to prevent hydrolysis of the organic silicon compounds.

The organic silicon compounds can be employed either alone or as mixtures with one another.

Aromatic polycarbonates in the sense of this invention are homopolycarbonates and copolycarbonates which are based, for example, on one or more of the following diphenols: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones and α,α'-bis-(hydroxyphenyl)-diisopropylbenzenes and their nuclear-alkylated and nuclear-halogenated compounds. These and other suitable diphenols are described, for example, in U.S. Pat. Nos. 3,028,365; 2,999,835; 3,148,172; 3,275,601; 2,991,273; 3,271,367; 3,062,781 and 2,999,846; in German Offenlegungsschriften (German Published Specifications) Nos. 1,570,703; 2,063,050; 2,063,052; 2,211,956 and 2,211,957; French Patent Specification 1,561,518 and the monograph "H. Schnell, Chemistry and Physics of Polycarbonates", Interscience Publishers, New York, 1964.

Examples of preferred diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl) p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Examples of particularly preferred diphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Preferred aromatic polycarbonates are those which are based on one or more of the diphenols mentioned as preferred. Copolycarbonates which are based on 2,2-bis-(4-hydroxyphenyl)-propane and one of the other diphenols mentioned as particularly preferred are most preferred. Polycarbonates based on 2,2-bis-(4-hydroxyphenyl)-propane or 2,2-bis-(3,5-dimethyl-4-hydroxyphenyl)-propane alone are particularly preferred.

The aromatic polycarbonates can be prepared by known processes, for example, by the melt transesterification process from bisphenol and diphenylcarbonate, and by the solution process from bisphenols and phosgene, as is described in the above-mentioned literature. Suitable solution processes are both the process in a homogeneous phase system, the pyridine process and the process in a heterogeneous phase system, the two-phase boundary process. Polycarbonates which have been prepared by the solution processes, in particular by the two-phase boundary process, are particularly suitable for stabilization according to the present invention.

The aromatic polycarbonates can be branched by incorporating small amounts, preferably amounts between 0.05 and 2.0 mol % (relative to the diphenols employed), of compounds which are trifunctional or more than trifunctional, for example those with three or more phenolic hydroxyl groups.

Polycarbonates of this type are described, for example, in German Offenlegungsschriften (German Published Specifications) Nos. 1,570,533; 1,595,762; 2,116,974 and 2,113,347; British patent specification No. 1,079,821; U.S. patent No. 3,544,514 and German Offenlegungsschrift (German Published Specification) No. 2,500,092 (LeA 16,142).

Examples of some of the compounds which have three or more phenolic hydroxyl groups and which can be used are phloroglucinol, 4,6-dimethyl-2,4,6-tri-(4-hydroxyphenyl)-hept-2-ene, 4,6-dimethyl-2,4,6-tri-(4-hydroxyphenyl)-heptane,1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2'-hydroxy-5'-methyl-benzyl)-4-methylphenol, 2-(4-hydroxyphenyl)-2-(2,4-dihydroxyphenyl)-propane and 1,4-bis-(4,4''-dihydroxytriphenyl-methyl)-benzene. Some of the other trifunctional compounds are 2,4-dihydroxybenzoic acid, trimesic acid, cyanuric chloride and 3,3-bis-(4-hydroxyphenyl)-2-oxo-2,3-dihydroindole.

The aromatic polycarbonates should as a rule have mean weight-average molecular weights $\overline{M}_w$ of 10,000 to over 200,000, preferably of 20,000 to 80,000, determined by measuring the relative viscosity in $CH_2Cl_2$ at 25° C. and at a concentration of 0.5% by weight.

In the case of the polycarbonate mixtures, small proportions of low molecular polycarbonates, for example with an average degree of polymerization of 2-20, can also be admixed with the high molecular polycarbonates ($\overline{M}_w$ of 10,000 to 200,000).

As is customary, the usual additives can be admixed with the aromatic polycarbonates before, during or after the preparation process, the organic silicon compounds according to the invention being distinguished by outstanding compatibility with other additives, such as, for example, UV absorbers or flameproofing agents.

Examples of additives which may be mentioned are: mold release agents, dyestuffs, inorganic pigments, UV absorbers and fillers, such as glass fibers, graphite, asbestos, metal powder and the like.

EXAMPLES

A polycarbonate based on 2,2-bis-(4-hydroxyphenyl)-propane having a solution viscosity $\eta_{rel}$ of 1.285 (0.5 g of polycarbonate in 100 ml of methylene chloride at 25° C.) and free from stabilizing additives having been prepared from 2,2-bis-(4-hydroxyphenyl)-propane and phosgene in a known manner by the two-phase boundary process was used as the base material for the investigations.

Various stabilizers were incorporated into this polycarbonate and the polycarbonates stabilized in this manner were investigated, in comparison with phosphite-stabilized material, with regard to the light transmission directly after processing and after heat aging at 140° for 1,500 hours, and in regard to hydrolytic resistance in a boiling test. The incorporation was effected by tumbling the particular stabilizer onto the polycarbonate and subsequent thermoplastic processing, for example, in a twin-screw extruder. The granules thereby obtained were processed to standard test specimens in an injection molding machine.

The light transmission of these standard test specimens was measured on freshly injection molded material at 420 nm in accordance with the method of DIN 5033 and DIN 4646. The same measurement was repeated after heat aging at 140° C. for 1,500 hours and the color of the test specimens was evaluated. The heat aging was carried out in air. In the hydrolysis test, the test specimens were treated in water boiling under atmospheric pressure and evaluated after 100 hours boiling time in each case.

The following compounds were incorporated into the polycarbonate and their stabilizing action was evaluated:

I Tris-[(3-ethyloxetan-3-yl)-methyl] phosphite
II 310 parts by weight (1 mol) of triphenylphosphite/426 parts by weight (1.5 mols) of cyclohexane-1,2-dicarboxylic acid bis-β-epoxypropyl ester (phosphite/epoxide mixture)
III Tris-[(3-ethyloxetan-3-yl)-methoxy]-methylsilane
IV Tetrakis-[(3-ethyloxetan-3-yl)-methoxy]-silane
V Tetraoctoxysilane
VI Tetrabutoxysilane
VII Tetrakis-[(5-ethyl-1,3-dioxan-5-yl)-methoxy]-silane
VIII 310 parts by weight (1 mol) of triphenylphosphite/306 parts by weight (3 mols) of 3-hydroxymethyl-3-methyloxetane.

The results of the light transmission measurement on I-VIII directly after processing and heat aging and the evaluation of the color after heat aging are shown in Table 1.

The primary brightening by the silicon compounds to be used according to the invention is in the order of size of the values obtained with phosphites or mixtures thereof, for example, with epoxides.

The superiority of the silicon compounds to be used according to the invention compared with phosphites and mixtures thereof is clearly manifested by a better light transmission and color after heat aging.

The results of the boiling test are given in Table 2. Compared with nonstabilized polycarbonate, a polycarbonate stabilized according to the invention has no disadvantages in terms of hydrolytic stability while phosphite stabilized polycarbonate exhibits a significant decrease in molecular weight and loss in mechanical properties after a boiling time of 700 hours.

TABLE 1

| Polycarbonate ($\eta_{rel}$:1.285) + 0.1% by weight of stabilizer | Light transmission at 420 nm (freshly injection molded sample) | Light transmission after heat aging at 140° C. for 1,500 hours | Color after heat aging at 140° C. for 1,500 hours |
| --- | --- | --- | --- |
| I | 0.850 | 0.700 | brownish |
| II | 0.840 | 0.490 | yellowish |
| III | 0.845 | 0.780 | almost colorless |
| IV | 0.855 | 0.795 | almost colorless |
| V | 0.850 | 0.790 | almost colorless |
| VI | 0.855 | 0.795 | almost colorless |
| VII | 0.855 | 0.800 | almost colorless |
| VIII | 0.840 | 0.680 | yellowish |

TABLE 2

| | Polycarbonate without stabilizer | | Polycarbonate containing 0.1% by weight of tris-[(3-ethyloxetan-3-yl)-methyl]-phosphite | | | Polycarbonate containing 0.1% by weight of tetra-kis-[(5-ethyl-1,3-dioxan-5-yl)-methoxy]-silane | | |
| --- | --- | --- | --- | --- | --- | --- | --- | --- |
| | $\eta_{rel}$ | $a_n$ | $\eta_{rel}$ | | $a_n$ | $\eta_{rel}$ | | $a_n$ |
| Boiling time [hours] | | | | | | | | |
| 0 value | 1.289 | n.b. | 1.289 | | n.b. | 1.293 | | n.b. |
| 100 | 1.285 | n.b. | 1.259 | (9) (1) | n.b. 90.9 | 1.288 | | n.b. |
| 200 | 1.284 | n.b. | 1.160 | (4) (6) | n.b. 16.7 | 1.285 | | n.b. |
| 300 | 1.275 | n.b. | 1.194 | | 4.9 | 1.275 | (9) (1) | n.b. 96.5 |
| 400 | 1.274 | (9) n.b. (1) 16.6 | 1.171 | | 1.8 | 1.276 | | n.b. |
| 500 | 1.269 | 44.4 | 1.155 | | 1.0 | 1.268 | | n.b. |
| 700 | 1.261 | (3) n.b. (7) 46.0 | 1.177 | | 0.8 | 1.261 | (4) (6) | n.b. 45.5 |
| 1,000 | 1.251 | (2) n.b. (8) 49.7 | — | | — | 1.254 | (2) (8) | n.b. 46.6 |
| 1,250 | 1.242 | (1) n.b. (9) 11.1 | — | | — | 1.244 | (3) (7) | n.b. 48.6 |
| 1,500 | 1.237 | 14.2 | — | | — | 1.234 | | 36.5 |

The numbers in parentheses denote the number of specimens
$\eta_{rel}$: relative solution viscosity
$a_n$: impact strength kg/m²;
n.b.: no failure

We claim:

1. A thermoplastic polycarbonate composition characterized in the absence of phosphites and boric acid ester therefrom comprising:
(i) 0.01 to 1.0 percent by weight of an organic silicon compound of the formula $$Si\text{-}(OR_2)_b$$

wherein b is 4 and $R_2$ is selected from the group consisting of (3-methyl-oxetan-3-yl)-methyl, (3-ethyl-oxetan-3-yl)-methyl, (3-amyl-oxetan-3-yl)-methyl, 2-methoxyethyl, 3-methoxy-propyl, 3-ethoxy-propyl, 3-(thiomethyl)-propyl, (5-ethyl-1,3-dioxan-5-yl)-methyl and 2,3-epoxy-propyl, $C_2$–$C_{18}$ alkenyl and $C_5$–$C_{10}$ cycloalkyl and (ii) aromatic polycarbonate resin prepared by a solution process.

2. The thermoplastic polycarbonate composition of claim 1 wherein said organic-silicon compound comprises 0.01 to 0.5 percent of its weight.

3. The thermoplastic polycarbonate composition of claim 1 or claim 2 wherein no pigments are incorporated.

4. A process for stabilizing thermoplastic aromatic polycarbonate resin prepared by a solution process which is characterized in the absence therefrom of phosphites and of boric acid esters comprising incorporating therein an organic-silicon compound of the formula $$Si\text{-}(OR_2)_b$$

wherein b is 4 and $R_2$ is selected from the group consisting of (3-methyl-oxetan-3-yl)-methyl, (3-ethyl-oxetan-3-yl)-methyl, (3-amyl-oxetan-3-yl)-methyl, 2-methoxyethyl, 3-methoxy-propyl, 3-ethoxy-propyl, 3-(thiomethyl)-propyl, (5-ethyl-1,3-dioxan-5-yl)-methyl and 2,3-epoxy-propyl, $C_2$–$C_{18}$ alkenyl and $C_5$–$C_{10}$ cycloalkyl said organic-silicon compound amounting to about 0.01 to 1 percent by weight relative to the weight of said polycarbonate resin plus weight of said organic-silicon compound.

5. The process of claim 4 wherein said organic-silicon compound amounts to about 0.01 to 0.5 percent by weight relative to the weight of said polycarbonate resin plus weight of said organic-silicon compound.

6. The process of claim 4 or claim 5 wherein no pigments are incorporated.

* * * * *